United States Patent [19]

Aubry et al.

[11] Patent Number: 4,861,821

[45] Date of Patent: Aug. 29, 1989

[54] COPOLYMERS BASED ON ETHYLENIC MONOMERS AND METHYLOLPHENYL ALLYL ETHERS

[75] Inventors: Jean Aubry, Bethune; Serge Cassiani-Ingoni, Ermont; Remi Hauschild, Paris, all of France

[73] Assignee: Societe Chimique Des Charbonnages S.A., Paris La Defense, France

[21] Appl. No.: 66,600

[22] Filed: Jun. 26, 1987

[30] Foreign Application Priority Data

Jun. 26, 1986 [FR] France .................................. 86 09258

[51] Int. Cl.$^4$ .............................................. C08L 61/00
[52] U.S. Cl. .................................... 524/512; 524/555;
524/556; 524/561; 524/562; 524/901; 525/118;
525/143; 525/162; 525/176; 525/219; 526/317;
526/320; 526/329.2; 526/334
[58] Field of Search ............ 526/334, 317, 320, 329.2;
525/502, 162; 524/512, 561, 562, 555

[56] References Cited

U.S. PATENT DOCUMENTS 4,098,745  7/1978  Borman .................................. 524/510
4,164,587  8/1979  Borman .................................. 426/131

Primary Examiner—Theodore E. Pertilla
Attorney, Agent, or Firm—Millen, White & Zelano

[57] ABSTRACT

Copolymers produced from 0.5–20% by weight mono-, bis- or trismethylolphenyl allyl ether (I) of formula:

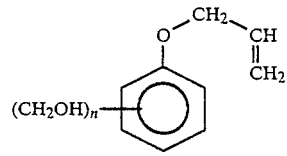

n being from 1 to 3, and from 80–99.5% by weight ethylenic monomers, at least one being a (meth)acrylic monomer are useful in the preparation of coatings, particularly in the field of paints, varnishes, inks and adhesives. Radical polymerization is employed with different stages of polymerization.

22 Claims, No Drawings

COPOLYMERS BASED ON ETHYLENIC MONOMERS AND METHYLOLPHENYL ALLYL ETHERS

BACKGROUND OF THE INVENTION

The present invention relates to new copolymers based on one or more ethylenic monomers and at least one mono-, bis- or trismethylolphenyl allyl ether of the formula I.

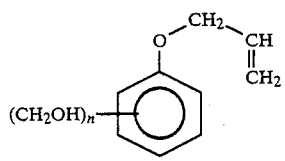

n being from 1 to 3.

The present invention also relates to a process for the preparation of these copolymers and to their application in the preparation of coatings, particularly in the fields of paints, varnishes, inks and adhesives.

Compound (I) is well known in the field of paints and varnishes. It is employed as a crosslinking additive to resins such as epoxy, phenolic, vinyl, polyester or aminoplastic resins, to which it imparts great hardness. In addition, it improves the adhesion and the flexibility of the coatings made using these resins. See, for example, U.S. Pat. Nos. 4,098,745 and 4,164,587.

However, the use of compound (I) presents many disadvantages.

Thus, the preparation of the coatings in which it is present requires a final stoving operation which must be carried out in the presence of an acidic catalyst such as orthophosphoric acid at temperatures above 165° C.

Use of compound (I) in the electrophoresis bath formulations is also known. In European Pat. No. 82,214, for example, compound (I) is added to an epoxyamine adduct. After neutralization with acetic acid, the mixture thus produced is employed in the preparation of a pigmented electrophoresis bath. A bath of this kind has poor stability. In fact, under the influence of the acid, acetic acid in this case, compound (I) partly condenses with itself, producing a release of formaldehyde. As a result, the adduct behaves like a thermoplastic. Compound (I) cannot therefore be employed in an acidic medium nor, consequently, can it be employed in cataphoresis.

Another deficiency of compound (I) lies in its poor pigment-wetting power when it is employed as an additive mixed into a formulation, for example a paint formulation. As a result, the high homogeneity which is essential if the best gloss, adhesion and chemical resistance properties are to be attained, cannot be obtained in these formulations.

SUMMARY OF THE INVENTION

An object of the present invention is to provide new thermosetting or thermoplastic copolymers based on ethylenic monomers and on compound (I), which have outstanding stability properties, even in an acidic medium, and which make it possible to prepare coatings having outstanding adhesive properties, as well as an outstanding resistance to a wide variety of chemical substances, especially solvents, greases and corrosive materials.

Upon further study of the specification and appended claims, further objects and advantages of this invention will become apparent to those skilled in the art.

More precisely, the invention provides thermosetting or thermoplastic copolymers, soluble in organic solvents and/or aqueous media, said copolymers being produced by radical polymerization of:

at least one mono-, bis- or trismethylolphenyl aly ether of the formula (I):

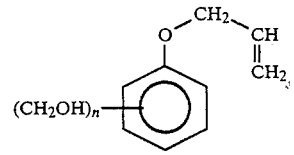

n being 1, 2 or 3, and at least one ethylenic monomer, at least one of these ethylenic monomers being a (meth)acrylic, i.e., methacrylic or acrylic) monomer, with at least 5%, preferably at least 50% of the ethylenic monomer being (meth)acrylic.

The copolymers according to the invention are preferably prepared from:

0.5 to 20% and preferably 3 to 12% by weight of at least one mono-, bis- or trismethylolphenyl allyl ether (I), and from 80 to 95.5% by weight of at least one ethylenic monomer.

For applications such as paints and varnishes, the copolymers according to the invention preferably have a weight average molecular weight of between 1500 and 10,000.

Among the ethylenic monomers suitable for the preparation of the copolymers according to the invention, there are included, but not limited to methacrylic and acrylic monomers such as (meth)acrylic acid, (meth)acrylic esters, for example methyl (meth)acrylate, ethyl (meth)acrylate, butyl (meth)acrylate and 2-ethylhexyl (meth)acrylate, hydroxylated (meth) acrylic monomers such as 2-hydroxyethyl (meth)acrylate and 2-hydroxypropyl (meth)acrylate, (methy)acrylic monomers containing amino groups such as N,N-dimethylaminoethyl (meth)acrylate and N,N'-diethylaminoethyl (meth)acrylate, and vinyl monomers such as vinyl acetate, styrene and α-methylstyrene.

By ethylenic monomers in the context of this invention is meant any ethylenic monomer except those of formula I above.

In contrast to the mixtures which contain the compound (I) in the unmodified "free" state, the copolymers according to the invention possess excellent pigment-wetting and dispersing properties, and consequently permit the pigment concentration to be increased while retaining an acceptable viscosity.

Coatings based on the copolymer according to the invention have high gloss and superior mechanical properties. They are also highly adhesive and have outstanding resistance to chemical substances. Furthermore, the copolymers according to the invention are stable in acidic media and can therefore be employed in cataphoresis.

The present invention also relates to a preferred process for the preparation of the copolymers according to the invention, comprises the steps of:

(a) The Compound (I), namely the mono-, bis- or tris-methylolphenyl allyl ether of the formula (I):

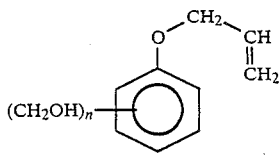

n being from 1 to 3, is introduced into an organic solvent at a temperature of 20° to 50° C., preferably with stirring.

(b) Air, present in the reaction medium is then expelled in order to remove oxygen; this operation may, for example, be performed with the aid of an inert gas bubbled into the reaction medium, for example with the aid of nitrogen. Advantageously, the removal of air is carried out by adding to the reaction medium a compound capable of generating, in situ, an inert gas permitting the air present in the reaction medium to be removed. Thus, a diazo polymerization catalyst may be employed, preferably in a proportion of 0.2 to 0.5% by weight, this value being based on the total quantity of the monomers used in the reaction, including the compound (I). In fact, as it decomposes, the diazo compound produces, in situ, a release of nitrogen which entrains the oxygen present in the reaction medium.

(c) A part of the catalyzed ethylenic monomers, especially 5 to 50% and preferably 10 to 30% by weight of the total quantity of the ethylenic monomers, is added to the reaction mixture (by catalyzed ethylenic monomers is meant an admixture of the ethylenic monomers and the catalyst).

(d) The temperature of the reaction mixture is then raised to 80°-140° C. and stirring is continued.

(e) The remaining quantity of ethylenic monomers is then added continuously, the temperature then being the reflux temperature if the organic solvent employed has a boiling point below 120°, or else a temperature of between 120° and 160° C. and preferably between 120° and 145° C. in the case where the organic solvent has a high boiling point, higher than these values, and the reaction is continued to complete polymerization.

Referring to the preceding process and without being bound by an explanation of the mechanism of the process, the functions of the steps are as follows:

(a) Compound (I) is introduced and dissolved as a first step because said compound exhibits a low rate of polymerization. Thus, by dissolving compound (I) first, it is possible to obtain a more homogeneous product at the end of the reaction;

(b) An atmosphere devoid of oxygen is provided because the presence of oxygen would otherwise inhibit the polymerization reaction;

(c) The polymerization is initiated at a moderate temperature below 80° C. in order to start a homogeneous polymerization between the ethylenic monomers and compound (I). Too high a temperature would otherwise result in the polymerization of the ethylenic polymers between themselves owing to the high rate of reaction of such polymers at higher temperatures.

(d) and (e) These steps complete the polymerization.

Dependent on the nature of the ethylenic monomers, the resultant polymers will be either thermoplastic or thermosetting. For example, monofunctional ethylenic monomers will be lead to thermoplastic resins and polyfunctional (e.g., two double bonds) will lead to thermosetting polymers.

Among the solvents which may be employed in the process according to the invention there may be mentioned glycols such as ethylene glycol and propylene glycol, esters such as ethylglycol acetate (i.e., acetate of ethoxy ethanol), ethers such as butylglycol (i.e., butoxyl ethanol), higher alcohols such as n-butanol and benzyl alcohol or, again, aromatic solvents such as xylene and toluene. It is also possible to employ as a solvent organic compounds which have a high boiling point or organic compounds which are solid at ambient temperature. These compounds must also be inert towards the reaction mixture and must have a low viscosity at the temperature of reaction.

In point of fact, it may be particularly advantageous to employ as a solvent a compound which is relatively nonvolatile at ambient temperature and which has particular properties which will benefit the copolymers of the invention. In this last category of solvents there may be mentioned plasticizers such as phthalates, adipates and citrates, oxyethylenated derivatives, for example nonylphenol containing, on average, 10 molecules of ethylene oxide (abbreviated name NP 10), nonylphenol containing, on average, 30 molecules of ethylene oxide (abbreviated name NP 30) or nonylphenol containing, on average, 100 molecules of ethylene oxide (abbreviated name NP 100) and trialkyl phosphates such as trimethyl phosphate, triethyl phosphate and tributoxyethyl phosphate, which impart outstanding heat resistance to the formulated resin. It is also possible, of course, to employ a combination of two or more of the above-mentioned solvents. The criterion of choice of these solvents is the complete solubility of the compound (I) in the solvent or the solvent mixture which is chosen.

Among the polymerization catalysts which can be employed in the process according to the invention there may be mentioned peroxides such as benzoyl peroxide, di-tert-butyl peroxide, lauroyl peroxide, perbenzoates such as tert-butyl perbenzoate, hydroperoxides such as cumene hydroperoxide; and diazo compounds such as 2,2'-azobis(isobutyronitrile) and 2,2'-azobis(2-methylbutyronitrile). Preferably, as the catalytically effective amount, 1 to 4% by weight of the polymerization catalyst is employed, based on the total quantity of ethylenic monomers employed.

In the course of steps (d) and (e) a temperature plateau is preferably maintained at the chosen temperature, of the order of 30 minutes and 3 to 4 hours respectively, this being counted from the end of the addition of the ethylenic monomers.

The present invention finds particular application in the fields of paints, varnishes, inks and adhesives.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

The mono-, bis- or trismethylolphenyl allyl ether (I) employed in Examples 1 to 7 is the compound sold by Allied Chemical under the trade name 75108 Methylon.

The characteristics of this compound as follows:
solids content (in %): 84–89
solvent: none
viscosity at 25° C. (in poises): 20–40 relative density: 1.163

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLE 1

The following are charged into a polymerization reactor fitted with a mechanical stirring system:
  ethoxy ethanol: 1,200
  75108 Methylon: 168
and nitrogen is then bubbled into this mixture.

Separately, a mixture of catalyzed monomers consisting of the following is prepared:
  methyl methacrylate: 440
  2-hydroxypropyl methacrylate: 470
  butyl acrylate: 1,390
  methacrylic acid: 268
  di-tert-butyl peroxide: 60

20% of the mixture of catalyzed monomers is added into the polymierization reactor and the reaction mixture thus obtained is mixed.

The temperature of the mixture is gradually raised to 125° C. (the injection of nitrogen is stopped at 65° C.). The remainder of the mixture of catalyzed monomers is then added continuously and the reaction is continued to complete polymerization; this step is carried out in 4 h 30 min.

The reaction mixture is then cooled to 95° C. and a solution consisting of the following is added:
  dimethylaminoethanol: 270
  deionized water: 1,330

An aqueous solution with a solids content of 50% is finally obtained. This solution may be employed in the formulation of stoving varnishes or lacquers. Furthermore, the aqueous solution copolymer prepared in this example has outstanding wetting and dispersing properties with regard to pigments.

EXAMPLE OF APPLICATION

A white lacquer is prepared according to the following formulation:
  aqueous solution with a solids content of 50%, prepared above: 100
  melamine-formaldehyde resin of the methoxymethylmelamine type with the trade name Dynomin MM-100 from Dyno Industries: 15
  rutile titanium oxide: 50
  butoxy ethanol: 20
  deionized water: 39

After homogenization, this lacquer is applied onto a metal sheet (thickness: 25 microns) and stoving is then carried out for 20 minutes at 120° C. A glossy and smooth film of outstanding appearance is obtained.

The characteristics of this film are:
  hardness (Persoz): 280 seconds
  flexibility (Erichsen): 8
  impact test (1 kg): 5 cm
  cross ruling test: good

EXAMPLE 2

Using the same operating conditions as in Example 1, a copolymer is prepared in solution from:
  ethylglycol acetate: 300
  75108 Methylon: 35
and from a mixture of catalyzed monomers consisting of:
  styrene: 115
  2-hydroxyethyl methacrylate: 118
  butyl acrylate: 348
  methacrylic acid: 70
  dicumyl peroxide: 14

The final solution obtained contains 70% solids and forms an outstanding medium for the formulation of stoving coatings such as high-solids lacquers.

EXAMPLE OF APPLICATION

A formulation is prepared from solution with a solids content of 70%, prepared in Example 2: 100
  methoxymethylmelamine resin under the trade name Dynomin MM-100: 25
  rutile titanium oxide: 72
  ethylglycol acetate: 5

The formulation obtained in this manner has a solids content of 80%. It can be applied by means of a high-speed disc gun and yields coatings which have outstanding qualities.

EXAMPLE 3

In accordance with the operating conditions given in Example 1, a copolymer is prepared in solution from:
  ethylglycol acetate: 671
  75108 Methylon: 140
and from a mixture of catalyzed monomers consisting of:
  styrene: 848
  2-hydroxyethyl methacrylate: 294
  dimethylaminoethyl methacrylate: 478.6
  dicumyl peroxide: 49.2

After polymerization, the final solution obtained is diluted with:
  ethylglycol acetate: 300
  methylglycol: 389

The solution obtained has the following characteristics:
  solids content: 60%
  amine value: 83
  hydroxyl value: 62

200 parts of a solution containing 50% lactic acid in deionized water are added to 100 parts of the solution described above. The solution produced forms a medium which can be employed in the formulation of coatings of the cataphoretic type.

EXAMPLE OF APPLICATION

Preparation of a cataphoretic coating

A colorless varnish with a solids content of 15% is prepared by diluting with deionized water the solution with a solids content of 60%, prepared above.

The operating conditions for deposition are as follows:
  voltages applied at the
  bath terminals: from 50 to 400 volts
  bath temperature: 25° C.
  residence time of the plates on which the deposits are produced: 2 minutes
  plates employed:
    degreased metal sheets
    iron phosphatization sheets
    zinc phosphatization sheets After the plates treated in this manner have been washed with water, stoving is performed at 180° C. for 10 minutes. The results are as follows:
thicknesses of the varnish films deposited (in microns):
   degreased sheets: 10–15
   ion phosphatization sheets: 12–16
   zinc phosphatization sheets: 15–20
the penetration in the hollow bodies is 80–90%
it is found, furthermore, that washing with water is easy.

EXAMPLE 4

By employing the operating conditions of Example 1, a copolymer is prepared in solution from:
   ethylglycol: 600
   75108 Methylon: 132
and from a mixture of catalyzed monomers consisting of:
   methyl methacrylate: 640
   butyl acrylate: 293
   methacrylate acid: 102
   di-tert-butyl peroxide: 36

At the end of the polymerization reaction and after cooling to 95° C., the solution produced is neutralized and diluted with:
   dionized water: 570
   ethanol: 565
   dimethylaminoethanol: 70

The end product is a solution with a solids content of 40% of a thermoplastic copolymer based on (meth)acrylic monomers and on methylolphenyl allyl ether and having outstanding properties for the formulation of varnishes and pigment coatings. In addition, this solution has outstanding wetting and dispersing properties with regard to pigments.

EXAMPLE 5

By employing the operating conditions of Example 1, a copolymer is prepared in solution from:
   ethylglycol: 200
   75108 Methylon: 26
and from a mixture of catalyzed monomers consisting of:
   styrene: 156
   ethyl acrylate: 317
   methacrylic acid: 66
   di-tert-butyl peroxide: 15.

At the end of reaction, the solution produced is cooled to 80° C. and diluted with 220 parts by weight of ethanol. A solution with a solids content of 60% is then obtained. This solution has an acid value of 70.

The copolymer manufactured in this manner has outstanding wetting and dispersing properties with regard to pigments.

EXAMPLE OF APPLICATION

Formulation of a Helio-type ink

This formulation is prepared from:
solution with a solids content of 60%, referred to above: 47.9
phthalocyanine blue: 9.2
micronized wax: 1.8
antifoam product: 0.6
ethanol: 40.5

The result is a formulation with a solids content of 40.3% which can be applied onto paper and onto polyvinyl chloride in particular, using the Helio method.

The coating produced exhibits outstanding printability and complete water resistance (water resistance higher than 500 revolutions in the Doitteau test).

EXAMPLE 6

By employing the operating conditions of Example 1, a copolymer is prepared in solution from:
   ethylglycol: 350
   75108 Methylon: 102
and from a mixture of catalyzed monomers consisting of:
   styrene: 200
   ethyl acrylate: 514
   methacrylic acid: 86
   dicumyl peroxide: 32

At the end of the reaction, the solution produced is cooled to 95° C. and is diluted and neutralized with:
   deionized water: 526
   dimethylaminoethanol: 50
   isopropanol: 474

A clear solution with a solids content of 40% and with an acid value of 60 is produced.

After application onto paper a dry, glossy and smooth film is obtained. This film is nonadhesive at 40° C. (it does not exhibit the phenomenon known as blocking). The copolymer manufactured in this manner also has outstanding wetting and dispersing properties with regard to pigments and an outstanding water resistance (water resistance higher than 500 revolutions in the Doitteau test).

EXAMPLE 7

The following are charged into a polymerization reactor fitted with a mechanical stirring system:
   condensate of ethylene oxide on nonylphenol (containing, on average, 30 molecues of ethylene oxide and with the abbreviated name of NP 30): 600
   75108 Methylon: 132

The temperature is then raised to 130° C. while nitrogen is blown into the reaction medium. As soon as the temperature reaches 125° C., a mixture of catalyzed monomers consisting of the following is added continuously:
   methyl methacrylate: 640
   butyl acrylate: 293
   methacrylic acid: 102
   di-tert-butyl peroxide: 34

The polymerization reaction is carried out at 130°–135° C. and takes approximately 4 hours.

The solution produced is cooled to 95° C. and is then neutralized and diluted with:
   deionized water: 3,166
   aqueous ammonia: 50
   dimethylaminoethanol: 10

The final product is a solution with a solids content of 40%, which has remarkable properties for wood treatment. This solution has, in fact, outstanding wetting and penetration qualities.

Furthermore, this solution wets and disperses iron oxides very well; as a result of this, it can be employed in the form of concentrated pastes in the preparation of wood glazes.

The preceding examples can be repeated with similar success by substituting the generically or specifically described reactants and/or operating conditions of this invention for those used in the preceding examples. For example, in place of the melamine formaldehyde resin having the trademark "Dyonium-MM100", it is possible to use other materials such as, for example, etherified melamine formaldehyde, e.g., "Veetle" 614 or 645 by BIP Chemical Co. or hexamethoxy methylmelamine such as, for example, "Cymel" 300, 301 or 325 by American Cyanamid.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A free radical polymerized copolymer, soluble in at least one of an organic solvent and an aqueous medium, of at least one mono-, bis- or trismethylolphenyl allyl ether (I) of formula:

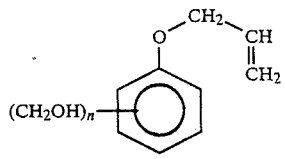

n being from 1 to 3, and of at least one ethylenic monomer, at least one of said ethylenic monomers being a (meth)acrylic monomer.

2. A copolymer according to claim 1, produced from:
0.5 to 20% by weight of at least one mono-, bis- or trismethylolphenyl allyl ether (I) and
from 80 to 95.5% by weight of at least one ethylenic monomer.

3. A copolymer according to claim 1, produced by a process comprising the steps of:
(a) the mono-, bis- or trismethylolphenyl allyl ether (I) of formula:

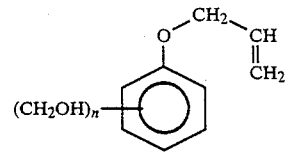

n being from 1 to 3, is introduced into an organic solvent at a temperature of 20° to 50° C., with stirring, (b) the air present in the reaction medium is then expelled, (c) a part of the catalyzed ethylenic monomers is added to the reaction mixture, (d) the temperature of the reaction mixture is then raised to 80°–140° C. and stirring is continued, (e) the remaining quantity of ethylenic monomers is then introduced continuously, the temperature then being the reflux temperature if the organic solvent employed has a boiling point below 120° C., or else a temperature of between 120° and 160° C. and the reaction is continued to complete polymerization.

4. A copolymer according to claim 3, wherein the removal of air in step (b) is performed by bubbling inert gas into the reaction medium.

5. A copolymer according to claim 3, wherein the removal of air in step (b) is performed by adding a compound capable of generating an inert gas in situ.

6. A copolymer according to claim 5, wherein the compound capable of generating an inert gas in situ is a diazo polymerization catalyst.

7. A copolymer according to claim 6, wherein the diazo polymerization catalyst is employed in a proportion of 0.2 to 0.5% by weight based on the total quantity of the monomers employed in the reaction, including the mono-, bis- or trismethylolphenyl allyl ether.

8. A copolymer according to claim 3, wherein 10 to 30% by weight of the total quantity of ethylenic monomers is added in step (c).

9. A copolymer according to claim 3, characterized in that the ethylenic monomers are catalyzed by 1 to 4% by weight of the polymerization catalyst.

10. A paint comprising the copolymer of claim 1.

11. An ink comprising the copolymer of claim 1.

12. An adhesive comprising the copolymer of claim 1.

13. A copolymer according to claim 2, wherein the ethylenic monomer is a mixture of methylmethacrylate, 2-hydroxy proplymethacrylate, butylacrylate and methacrylic acid.

14. A copolymer according to claim 2, wherein the ethylenic monomer is a mixture of styrene, 2-hydroxy ethylmethacrylate, butylacrylate and methacrylic acid.

15. A copolymer according to claim 2, wherein the ethylenic monomer is a mixture of styrene, 2-hydroxy ethylmethacrylate and dimethylamino ethylmethacrylate.

16. A copolymer according to claim 2, wherein the ethylenic monomer is a mixture of methylmethacrylate, butylacrylate and methacrylic acid.

17. A copolymer according to claim 2, wherein the ethylenic monomer is a mixture of styrene, ethylacrylate and methacrylic acid.

18. A varnish comprising the copolymer of claim 1.

19. A paint according to claim 10, further comprising a pigment.

20. An ink according to claim 11, further comprising a dye.

21. An adhesive according to claim 12, further comprising at least one of an organic solvent and water.

22. A varnish according to claim 18, further comprising an organic solvent.

* * * * *